United States Patent
Shiomi

(10) Patent No.: US 10,761,371 B2
(45) Date of Patent: Sep. 1, 2020

(54) DISPLAY DEVICE

(71) Applicant: SHARP KABUSHIKI KAISHA, Sakai, Osaka (JP)

(72) Inventor: Makoto Shiomi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/348,669

(22) PCT Filed: Oct. 10, 2017

(86) PCT No.: PCT/JP2017/036599
§ 371 (c)(1),
(2) Date: May 9, 2019

(87) PCT Pub. No.: WO2018/092465
PCT Pub. Date: May 24, 2018

(65) Prior Publication Data
US 2019/0265552 A1 Aug. 29, 2019

(30) Foreign Application Priority Data
Nov. 15, 2016 (JP) .................................. 2016-222733

(51) Int. Cl.
*G02F 1/1335* (2006.01)
*G09G 3/36* (2006.01)
(Continued)

(52) U.S. Cl.
CPC ........ *G02F 1/133609* (2013.01); *G02F 1/133* (2013.01); *G06T 5/00* (2013.01);
(Continued)

(58) Field of Classification Search
CPC ........... G09G 2360/16; G09G 2340/06; G09G 2320/0666; G09G 2320/0626;
(Continued)

(56) References Cited

U.S. PATENT DOCUMENTS

2005/0270382 A1    12/2005   Kurumisawa
2006/0158565 A1    7/2006    Miyazawa et al.
(Continued)

FOREIGN PATENT DOCUMENTS

JP     2002-064839 A    2/2002
JP     2005-348355 A    12/2005
(Continued)

OTHER PUBLICATIONS

"Reference electro-optical transfer function for flat panel displays used in HDTV studio production", Recommendation ITU-R BT.1886 (Mar. 2011).
(Continued)

*Primary Examiner* — Dong Hui Liang
(74) *Attorney, Agent, or Firm* — ScienBiziP, P.C.

(57) ABSTRACT

A change of a color tone of an image to be displayed is suppressed. A liquid crystal display device (1) displays an original image having a first dynamic range in a second dynamic range narrower than the first dynamic range. The liquid crystal display device includes a display control circuit (50) that lowers luminance of a dominant color having luminance higher than predetermined luminance to the predetermined luminance or less and lowers luminance of a non-dominant color.

11 Claims, 4 Drawing Sheets

(51) Int. Cl.
  *G02F 1/13357* (2006.01)
  *H04N 1/407* (2006.01)
  *G06T 5/00* (2006.01)
  *G02F 1/133* (2006.01)

(52) U.S. Cl.
  CPC .......... *G09G 3/3607* (2013.01); *H04N 1/407* (2013.01); *G02F 2001/133626* (2013.01); *G09G 2320/066* (2013.01); *G09G 2320/0673* (2013.01); *G09G 2360/16* (2013.01)

(58) Field of Classification Search
  CPC ... G09G 2320/0271; G09G 2300/0452; G09G 5/02; G09G 5/10; G09G 3/2003; G02F 2203/30; G02F 1/137; G02F 1/133609; G02F 2001/134345
  See application file for complete search history.

(56) References Cited

U.S. PATENT DOCUMENTS

| | | | |
|---|---|---|---|
| 2007/0080975 A1 | 4/2007 | Yamashita et al. | |
| 2009/0052774 A1* | 2/2009 | Yoshii | H04N 9/69 382/167 |
| 2012/0020556 A1 | 1/2012 | Manabe | |
| 2018/0061026 A1* | 3/2018 | Kozuka | H04N 9/69 |

FOREIGN PATENT DOCUMENTS

| | | |
|---|---|---|
| JP | 2006-179978 A | 7/2006 |
| JP | 2007-312349 A | 11/2007 |
| JP | 2009-278227 A | 11/2009 |
| JP | 2012-044639 A | 3/2012 |

OTHER PUBLICATIONS

"High Dynamic Range Electro-Optical Transfer Function of Mastering Reference Displays", SMPTE ST 2084:2014.

Technical Bulletin TB-2014-004 Informative Notes on SMPTE ST 2065-1—Academy Color Encoding Specification (ACES), Mar. 29, 2016.

* cited by examiner

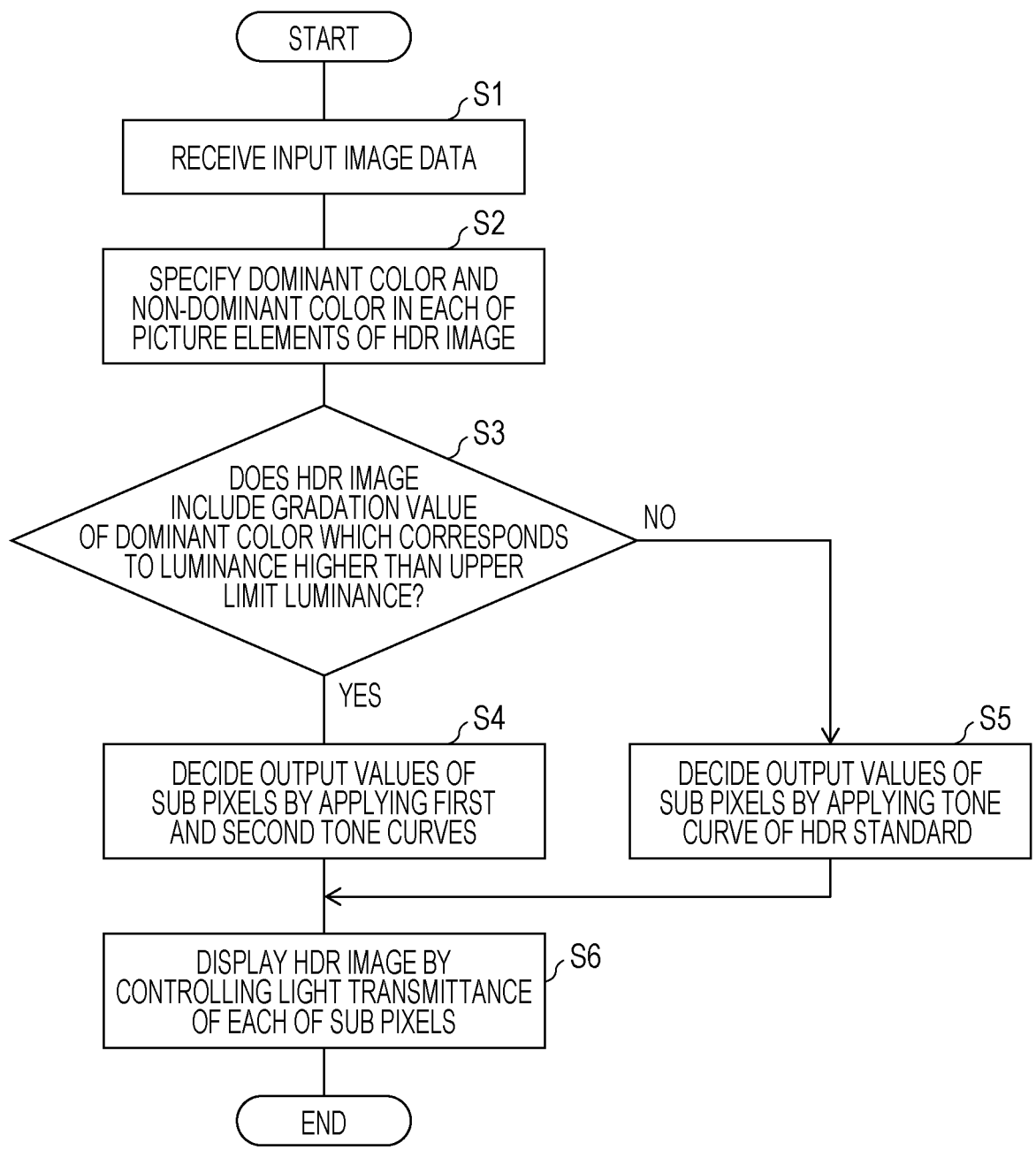

DISPLAY DEVICE

TECHNICAL FIELD

The present disclosure relates to a display device that displays an image.

BACKGROUND ART

In recent years, standardization of television broadcasting that employs HDR (High Dynamic Range) has been advanced in order to achieve higher reproduction in texture of a material or higher reproduction in realistic sensation. HDR (ST2084) of PQ that is proposed by Dolby and others, HDR BT. 1886 of EtC that is proposed by SER and others, and the like have great potential. Either of the techniques has a feature that representation of a dynamic range far exceeds a conventional television standard.

PTL 1 discloses a technique in which an HDR image is generated by combining a plurality of pieces of image data having different exposure values and performing emphasis of a luminance component on the combined image.

CITATION LIST

Patent Literature

PTL 1: Japanese Unexamined Patent Application Publication No. 2012-044639 (published on Mar. 1, 2012)

SUMMARY OF INVENTION

Technical Problem

A display device that displays an HDR image has a problem in that, when an intermediate color including luminance that exceeds an upper limit of a display capability or luminance close to the upper limit is displayed, luminance of part of pixels constituting a picture element is lowered and therefore a color tone of the picture element is changed. In order to explain the problem, luminance of a pixel that is required for faithfully displaying the HDP image is referred to as ideal luminance to be distinguished from actual luminance of the pixel.

For example, it is assumed that one picture element is constituted by a red pixel, a green pixel, and blue pixel and when a certain HDR image is displayed, a pixel whose ideal luminance is highest in a certain picture element is the green pixel and the ideal luminance of the green pixel exceeds the upper limit of the display capability.

In this case, the green pixel emits light with luminance within a range of the display capability, and the luminance of the green pixel is lower than the ideal luminance. At this time, in a case where the ideal luminance of the red pixel and the blue pixel that constitute the picture element is within the range of the display capability, the red pixel and the blue pixel emit light with the ideal luminance. Thus, among R (red), C (green), and B (blue) that are components of colors expressed by the picture element, G is lowered and thus a color tone of the picture element is changed.

In order to avoid such a problem, a method of performing display by compressing luminance in all gradation so that maximum luminance of the display device matches maximum luminance of an HDR standard is considered. With this method, however, although display with the maximum luminance of the HDR image is enabled, display of a low-luminance region of HDR is performed by gradation having a narrow range on a low-gradation side, and therefore a most display region that does not reach luminance distinctive of the HDR is black out. Thus, it is difficult to display an appropriate image by the method.

An aspect of the disclosure aims to suppress a change of a color tone of a displayed image when an HDR image is displayed.

Solution to Problem

In order to solve the aforementioned problem, a display device according to an aspect of the disclosure is a display device that displays an original image, which includes a plurality of picture elements and has a first dynamic range, in a second dynamic range narrower than the first dynamic range. Each of the plurality of picture elements is displayed by a plurality of colors or a combination of the plurality of colors, and image data indicating the original data has a plurality of gradation values corresponding to the plurality of colors in each of the plurality of picture elements. The display device includes a display control unit that sets, among the plurality of colors, a color corresponding to a maximum gradation value of gradation values of the picture element to a dominant color and sets color other than the dominant color to a non-dominant color, and that lowers luminance of a dominant color having luminance higher than predetermined luminance to be the predetermined luminance or less and lowers luminance of the non-dominant color.

Advantageous Effects of Invention

According to the aspect of the present disclosure, when an HDR image is displayed, it is possible to suppress a change of a color tone of an image to be displayed.

BRIEF DESCRIPTION OF DRAWINGS

FIG. 5 is a flowchart illustrating an example of a flow of processing in the liquid crystal display device.

DESCRIPTION OF EMBODIMENTS

Embodiment 1

An embodiment of the disclosure will be described in detail. A case where a liquid crystal display device (display device) 1 of an embodiment of the disclosure receives an HDR image as an original image is considered. In this case, when luminance of a picture element included in the HDR image exceeds luminance realizable in the liquid crystal display device 1, the liquid crystal display device 1 displays the picture element by lowering the luminance of the picture element to luminance within a range achievable in the liquid crystal display device 1. In other words, the liquid crystal display device 1 displays the HDR image by changing a dynamic range (first dynamic range) of the HDR image that is received to a dynamic range (second dynamic range) that is able to be displayed by the liquid crystal display device 1. Note that, the luminance realizable in the liquid crystal display device 1 is referred to as a display performance limit of the liquid crystal display device 1 in some cases.
(Configuration of Liquid Crystal Display Device)

Figure 1:
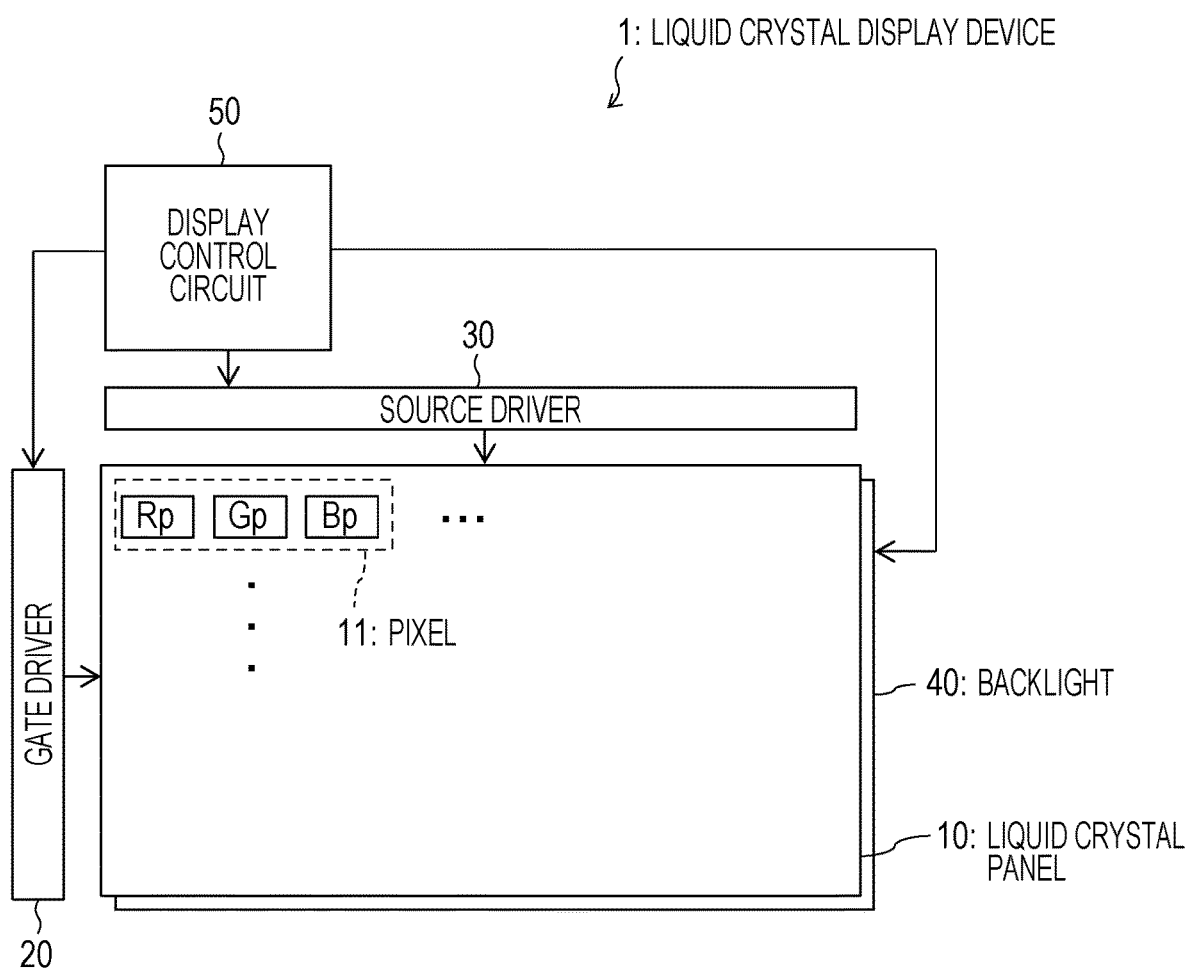
FIG. 1 is a block diagram illustrating a main configuration of a liquid crystal display device according to Embodiment 1.

FIG. 1 is a block diagram illustrating a main configuration of the liquid crystal display device 1. As illustrated in FIG. 1, the liquid crystal display device 1 includes a liquid crystal panel 10, a gate driver 20 and a source driver 30 that drive the liquid crystal panel 10, a backlight 40 that radiates light to the liquid crystal panel 10, and a display control circuit (display control unit) 50. The display control circuit 50 performs display control of the liquid crystal display device 1 by controlling the gate driver 20, the source driver 30, and the backlight 40.

In the liquid crystal display device 1, each of a plurality of picture elements constituting an image (display target image) to be displayed is displayed by a plurality of colors or a combination thereof. In the liquid crystal panel 10, a plurality of pixels 11 are arrayed, for example, in a matrix and each of the pixels 11 is constituted by a plurality of sub pixels. The sub pixels include a red pixel Rp, a green pixel Gp, and a blue pixel Bp. Note that, in addition to the R, G, and B, a sub pixel (for example, yellow or white pixel) may be included in the liquid crystal panel 10. Additionally, from a viewpoint of adjustment of color balance, any of the R, G, and B sub pixels may be included by two or more in the respective pixels 11. For example, as the sub pixels, one red pixel Rp, one blue pixel Bp, and two green pixels Gp (that is, R, G1, G2, and B) may be included in any of the pixels 11.

A display device as a target to which an aspect of the disclosure is applied is not limited to the liquid crystal display device and may be a display device of a different type such as an organic EL (EiectroLuminescene) display device, a projection device, or a plasma display device.
(HDR Image to be Displayed)

Description will be given below by assuming that an image displayed by the liquid crystal display device 1 is an HDR image having a dynamic range that exceeds a dynamic range achievable in the liquid crystal display device 1. The HDR image is constituted by a plurality of picture elements. In image data (referred to as input image data) indicating the HDR image, each of the picture elements is expressed by a combination of three gradation values corresponding to three primary colors (R, G, and B) of light, which are color components.

In other words, the input image data has a plurality of gradation values corresponding to a plurality of colors for each of the plurality of picture elements. Specifically, the input image data includes, for each of the picture elements, a red gradation value that defines gradation of red, a green gradation value that defines gradation of green, and a blue gradation value that defines gradation of blue. The gradation values are all indicated by 12-bit data in the present embodiment.

The HDR image may be a static image or a moving image. The picture elements constituting the HDR image and the pixels 11 of the liquid crystal panel 10 are not necessarily In one-to-one correspondence, and one picture element may be displayed by a plurality of pixels 11.
(Definition of Dominant Color and Non-Dominant Color)

A color corresponding to a maximum gradation value of gradation values of a target picture element among the R, G, and B is referred to as a dominant color and a color other than the dominant color is referred to as a non-dominant color. Which color is the dominant color is decided for each of the picture elements.

Among the three kinds of sub pixels that constitute the pixel 11, a sub pixel corresponding to the dominant color is referred to as a first sub pixel and a sub pixel corresponding to the non-dominant color is referred to as a second sub pixel.
(Details of Display Control Circuit 50)

Figure 2:
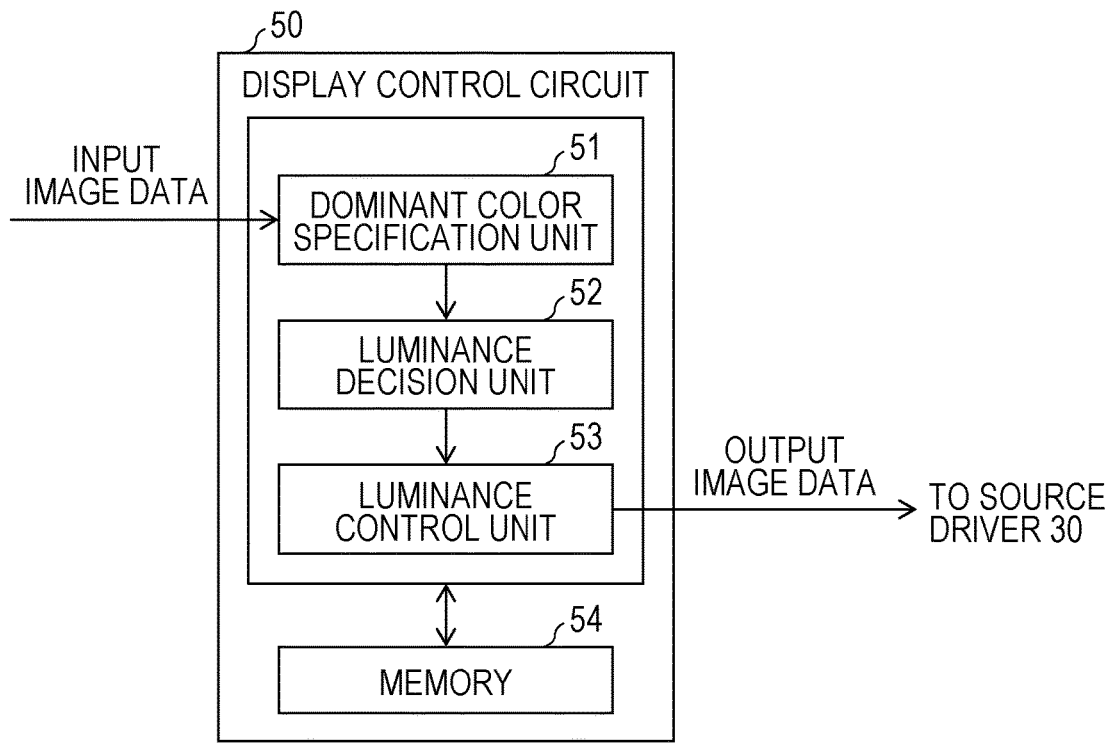
FIG. 2 is a functional block diagram illustrating a configuration of a display control circuit included in the liquid crystal display device.

FIG. 2 is a functional block diagram illustrating a function of the display control circuit 50. The display control circuit 50 includes a dominant color specification unit 51, a luminance decision unit 52, a luminance control unit 53, and a memory 54.
(Dominant Color Specification Unit 51)

The dominant color specification unit 51 specifies the dominant color in each of the picture elements of the HDR image by analyzing the input image data indicating the HDR image.

Specifically, for each of the picture elements of the HDR image, the dominant color specification unit 51 mutually compares three gradation values of the picture element to specify a color, which corresponds to the maximum gradation value that is a largest value, as the dominant color and specify a color other than the dominant color as the non-dominant color.

Moreover, in a case where the three gradation values of the picture element are the same (in a case where the picture element is gray or white), the dominant color specification unit 51 specifies all the colors as dominant colors.

In a case where two gradation values among the three gradation values of the picture element are substantially the same values and each of the two gradation values is larger than the remaining one gradation value, the dominant color specification unit 51 may specify two colors corresponding to the two gradation values as dominant colors. That is, in a case where a difference between two high-order gradation values is in a predetermined range, the dominant color specification unit 51 may specify two colors corresponding to the two high-order gradation values as the dominant colors.

Furthermore, the dominant color specification unit 51 may determine whether or not a second largest gradation value is larger than a specific gradation value, and when the second largest gradation value is larger than the specific gradation value, the dominant color specification unit 51 may specify two colors which correspond to the maximum gradation value and the second largest gradation value as the dominant colors. As the specific gradation value, a gradation value at which difference between display luminance of a first tone curve and display luminance of a second tone curve, which are described below, starts to be remarkable may be selected in consideration of brightness of the HDR. In a case where the display target image is constituted by 12-bit data, the specific gradation value may be, for example, 2048 gradation or 3072 gradation.

Moreover, the dominant color specification unit 51 may specify a color corresponding to the maximum gradation value as the dominant color, a color corresponding to the second largest gradation value as an intermediate color, and a color corresponding to a minimum gradation value as the non-dominant color. The specified intermediate color may include a color corresponding to a gradation value other than the maximum gradation value and the minimum gradation value. In other words, the intermediate color indicates a color corresponding to a gradation value other than the minimum gradation value in the non-dominant color.

Note that, in a case where the input image data received by the liquid crystal display device 1 is not data in an RGB format (for example, in a YUV format), the dominant color specification unit 51 specifies the dominant color by converting a data format of the input image data into the RGB format.

Here, in the case of the YUV format, a 4:2:2 format or a 4:2:0 format is employed in a general liquid crystal display device. This is because a human visual sense is insensitive to variation in color as compared with variation in luminance. Thus, it is premised that each of 2×2 picture elements that use a common color-difference signal expresses a similar color.

In this regard, in the case of the YUV format, one picture element group for which the dominant color is to be specified by the dominant color specification unit 51 may be constituted by a plurality of minimum picture elements (for example, 2×2 minimum picture elements) that are the picture elements using the common-difference color signal. In general, the plurality of minimum picture elements are a set of minimum picture elements that are adjacent to each other. The dominant color specification unit 51 may specify the dominant color and the non-dominant color by considering the plurality of minimum picture elements as the one picture element group. In other words, the dominant color specification unit 51 may specify at least the dominant color for the picture element group including the plurality of picture elements using the common-different signal. Note that, the specification of the dominant color and the non-dominant color is performed in a unit of the picture element group (that is, the dominant color and the non-dominant color are common among the plurality of minimum picture elements), but the luminance decision unit 52 described below applies, for each of three kinds of gradation values of the minimum picture element, the first or second tone curve which corresponds to a color of the gradation value.

Note that, such a set of the plurality of picture elements is also able to be applied to an HDR image having multi-primary color picture elements other than to the general HDR image in the RGB format, and is also able to be applied to a case where each of the dominant color and the non-dominant color is expressed by a plurality of hues (example: expression based on a 24 hue circle indicated by the following modification example).

(Luminance Decision Unit 52)

The luminance decision unit 52 applies the first tone curve (first pattern) to the dominant color and applies the second tone curve (second pattern) to the non-dominant color to thereby decide output values (luminance (display luminance) in a display screen) of the sub pixels (the red pixel Rp, the green pixel Gp, and the blue pixel Bp) constituting the pixel 11 which corresponds to each of the picture elements of the HDR image. In other words, the luminance decision unit 52 sets a relation between the gradation values of the display target image and display luminance (light transmittances in the sub pixels) corresponding to the respective gradation values by using the first and second tone curve.

For example, in a case where the G is the dominant color, the luminance decision unit 52 applies the first tone curve to an input value (gradation value) of the green pixel Gp as a first sub pixel and applies the second tone curve to input values (gradation values) of the red pixel Rp and the blue pixel Bp as second sub pixels.

The first tone curve is a tone curve by which luminance of a dominant color having luminance higher than predetermined luminance (hereinafter, referred to as upper limit luminance) is lowered to be the upper limit luminance or less in the HDR image. The second tone curve is a tone curve by which luminance of the non-dominant color is lowered. By applying the second tone curve to the non-dominant color, it is possible to prevent a change of a color tone of a picture element which is accompanied with the lowering of the luminance of the dominant color.

Here, luminance of a sub pixel that is required for faithfully displaying the HDR image is referred to as ideal luminance, and actual luminance of the sub pixel is referred to as display luminance. In another expression, the first tone curve described above is a tone curve by which, in a case where the ideal luminance indicated by the HDR image is higher than upper limit luminance that is defined on the basis of the display performance limit of the liquid crystal display device 1, the ideal luminance is corrected (luminance is lowered) to appropriate luminance within a range of a display capability of the liquid crystal display device 1. The upper limit luminance is an upper limit of luminance realizable in the liquid crystal display device 1 or luminance lower than the upper limit which is set by considering the upper limit.

In the present specification, luminance of each of colors means an output of each of the colors which corresponds to the luminance. Even in a case where gradation values of the respective colors are the same, the luminance of the green is highest and the luminance of the blue is lowest. In a case where luminance of white display is 1000 nit, the luminance of the green is 700 nit, the luminance of the red is 200 nit, and the luminance of the blue is 100 nit among 1000 nit. An upper limit value of the luminance of each of the colors varies for each of the colors and an upper limit of the luminance of each of the colors is considered as an upper limit of the output of each of the colors. Hereinafter, in a case of expressing the luminance of each of the colors, the luminance of the color is expressed not as actual luminance of the color but as luminance of white in which the color is included as a component. For example, in a case where display luminance of the green is expressed as 1000 nit, actual luminance thereof is about 700 nit.

Since the change of the color tone is not required to be considered for a picture element having an achromatic color (gray or white) whose gradation values of the R, G, and B are the same values, the luminance decision unit 52 applies only the first tone curve to color components of the picture element.

The luminance decision unit 52 may change the first tone curve and the second tone curve to be used in accordance with a display mode (a photographing mode, a cinema mode, or the like) of the liquid crystal display device 1. The display mode is able to be changed by a user of the liquid crystal display device 1 and the user is able to adjust brightness of an image in accordance with a preference of the user.

Additionally, in a case where the dominant color specification unit 51 specifies the dominant color, the intermediate color, and the non-dominant color, a third tone curve (third pattern) may be applied to the intermediate color. The third tone curve is decided on the basis of the first and second tone curves. The third tone curve may be, for example, a tone curve obtained by combining the first and second tone curves in accordance with a proportion of distribution of the respective gradation values which correspond to the dominant color, the intermediate color, and the non-dominant color in the picture element. Moreover the third tone curve may be an intermediate tone curve between the first tone curve and the second tone curve.

The luminance control unit 53 controls a light transmittance of each of the sub pixels so that the luminance of the sub pixel is luminance decided by the luminance decision unit 52.

The memory 54 is a non-volatile storage device in which the first and second tone curves, an LUT (Lock-Up Table), and various setting values are stored.

Additionally, in the display control circuit 53, a calculation unit by which the first, second, or third tone curve is deformed on the basis of user setting and a volatile storage device in which a result thereof (the deformed first, second, or third tone curve deformed by the calculation unit) is stored are arranged to be adjacent to the memory 54. The calculation unit may set and deform the third tone curve, which has an intermediate function between the first and second tone curves, on the basis of a ratio of the display luminance indicated by the first and second tone curves.

(Specific Example of Tone Curves)

Figure 3:
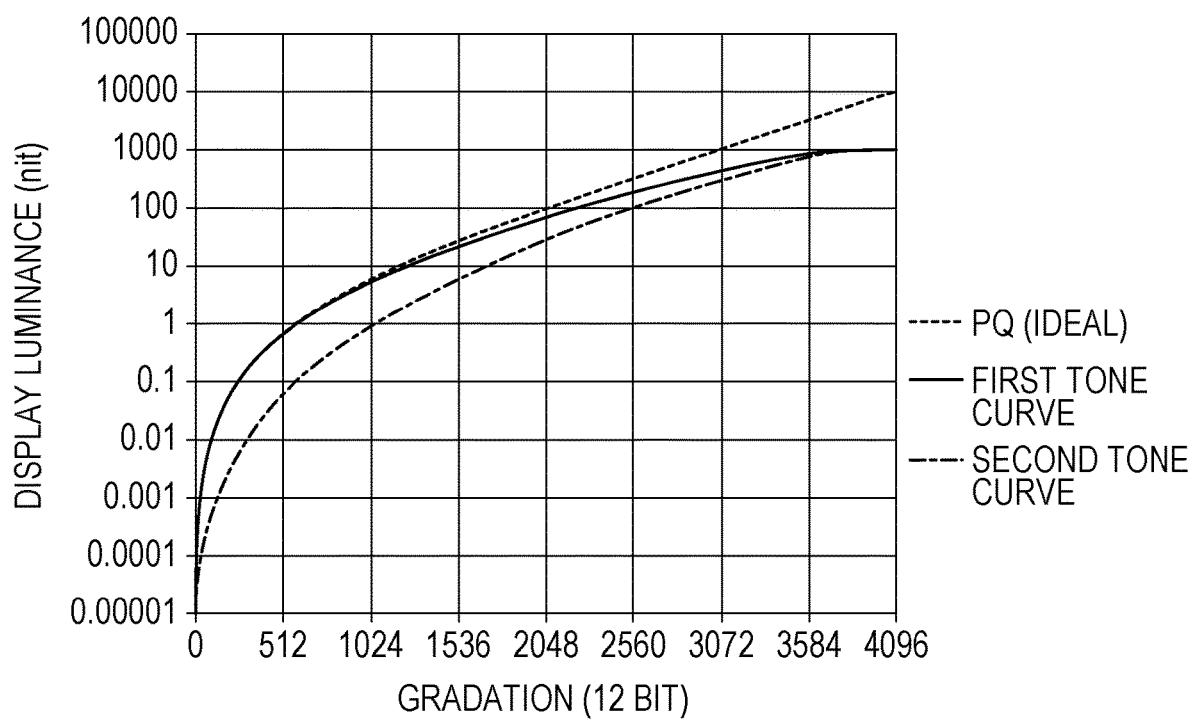
FIG. 3 is a diagram illustrating an example of tone curves used in the display control circuit.

A specific example of the first tone curve and the second tone curve will be described with reference to FIG. 3. FIG. 3 is a diagram illustrating an example of the tone curves used in the display control circuit 50. Note that, the HDR (ST2084) of PQ is used as a tone curve of the HDR standard in FIG. 3, but the HDR BT. 1886 of HLG be used. The same is also applied to FIG. 4 described below.

In the figures (particularly in FIG. 4), in order to easily understand that the first and second tone curves are deformed in accordance with the display performance limit of the liquid crystal display device 1, the first and second tone curves are illustrated so as to appear to be greatly curved at predetermined gradation. However, as described below, it is preferable that the first and second tone curves are smooth curved lines as long as functions thereof are not impaired.

(Specific Example of First Tone Curve)

The first tone curve lowers luminance of a dominant color having luminance higher than the upper limit luminance to the upper limit luminance or less and thus at least a high-luminance side thereof has a curved line in which the display luminance continuously increases as display gradation increases. A low-luminance side of the first tone curve may be the same as or similar to a conventional tone curve (example: the tone curve of the HDR standard).

Additionally, it is preferable that the tone curve on the high-luminance side is smoothly connected to the tone curve on the low-luminance side. In a case where the connection is not smooth, there is a possibility that a visually unnatural image is displayed depending on an extent thereof.

In order to realize the first tone curve that satisfies such conditions, the first tone curve is created by multiplying the tone curve of the HDR standard by a cosine curve, for example.

In a range of $0 \leq \theta < \pi/2$ ($\theta$ is a phase), the cosine curve takes a value that is 1 or less and larger than 0. In a case where a vertical axis indicates luminance (a relative value) and a horizontal axis indicates gradation, the cosine curve has a shape in which the luminance on the low-gradation side has a value close to 1 and the luminance is rapidly close to 0 toward the high-luminance side. The shape means that in a case where the cosine curve is applied to luminance-gradation characteristics (example: the tone curve of the HDR standard), the luminance of the characteristics on the low-gradation side is hardly changed, but luminance of the characteristics on the high-gradation side is greatly changed.

Thus, by multiplying the tone curve of the HDR standard by the cosine curve, a tone curve in which the luminance on the low-gradation side has a value that is the same as or similar to luminance indicated by the tone curve of the HDR standard and the luminance on the high-gradation side is significantly lowered compared with the luminance indicated by the tone curve of the HDR standard is able to be generated. That is, such a generating method is suitable for a method of generating the first tone curve that lowers the luminance of the HDR image on the high-gradation side.

The shape of the cosine curve is able to be changed by adjusting a value of $\theta$ and/or raising the cosine curve. Thus, by multiplying the tone curve of the HDR standard by the cosine curve in which the value of $\theta$ or a value to be raised is appropriately adjusted, the first tone curve in which the luminance on the high-luminance side is the upper limit luminance or less compared to the tone curve of the HDR standard and the luminance on the low-luminance side is the same as or similar to that of the tone curve of the HDR standard is able to be generated.

In the example of FIG. 3, as the first tone curve, one obtained by multiplying the tone curve of the HDR standard ("PQ (ideal)" in the figure) by the cosine curve obtained by multiplying a value (luminance value) of the cosine curve in which a phase is $0 \leq \theta \leq (\text{gradation}/4095) \times 0.46 \times \pi$ by 1.1 is illustrated.

In the above, needless to say, adjustment of an upper limit value of $\theta$ is necessary processing. For example, in a case where the upper limit value of $\theta$ is $\pi/2$, the value of the cosine curve is 0 and thus gradation inversion occurs in a region where a gradation value is a predetermined value or larger. Since it is natural that the luminance-gradation characteristics indicated by the first tone curve monotonically increase, the upper limit of $\theta$ is required to be restricted not to generate a largest value of luminance in intermediate gradation of the characteristics due to the occurrence of the gradation inversion, for example. At least a relation of the upper limit value of $\theta < \pi/2$ is required.

The display performance limit of the liquid crystal display device 1 also exists on the low-gradation side, that is, on a black color side. Thus, in a case where the HDR image is displayed without performing appropriate processing, black out may occur. In order to avoid the occurrence of the black out, the first tone curve may be created by deciding and normalizing a minimum value (0% luminance) of the tone curve of the HDR standard (ideal tone curve) in accordance with the display performance limit and using the normalized tone curve of the HDR standard. When the avoidance of the occurrence of the black out is not taken into consideration, processing for the avoidance is not performed for the tone curve of the HDR standard, and the tone curve of the HDR standard may be used as it is.

(Specific Example of Second Tone Curve)

In the second tone curve by which the luminance of the non-dominant color is lowered, a curved line in which luminance is lowered compared to the tone curve of the HDR standard is applied to at least the low-gradation side. It is preferable that in the second tone curve, a change rate of luminance relative to a change of a gradation value becomes smaller as the gradation is lower, and in a case where the gradation values of the R, G, and B of a picture element of the HDR image=0, luminance=0 (the picture element having the gradation values has a black color) is satisfied. It is preferable that a change rate of luminance in a gradation value corresponding to luminance (example: luminance of 10 nit or less in a case where the upper limit luminance is 1000 nit) that is 1% or less of the upper limit luminance is smaller than a change rate of luminance in a gradation value corresponding to luminance that is higher than 1% of the upper limit luminance. This is because in a case where a contrast ratio is relatively large, such as 100 (example: the luminance of the non-dominant color is 5 nit while the luminance of the dominant color is 500 nit), even when the non-dominant color is further darkened, color purity is hardly affected.

The second tone curve is applied to the display target image with the first tone curve. Thus, it is preferable that a shape of the second tone curve is similar to a shape of the first tone curve so as not to cause discomfort for display of the HDR image and a change of the luminance on the low-luminance side is relatively large while a change of the luminance on the high-luminance side is small. That is, the second tone curve is preferably decided on the basis of the first tone curve.

In order to realize the second tone curve that satisfies such conditions, the second tone curve is created by multiplying the first tone curve by a gamma curve, for example.

In a case where a vertical axis indicates luminance (a relative value) and a horizontal axis indicates gradation, the gamma curve has a shape in which when a $\gamma$ value is larger than 0, the luminance on the high-luminance gradation side has a value close to 1 and the luminance is rapidly close to 0 toward the low-luminance side. The shape means that in a case where the gamma curve is applied to luminance-gradation characteristics (example: the first tone curve), the luminance of the characteristics on the low-gradation side is greatly changed, but the change becomes small (close to luminance of the characteristics) toward the high-gradation side.

Thus, by multiplying the first tone curve by the gamma curve, a tone curve in which the luminance on the low-gradation side is significantly small compared with the luminance of the first tone curve and is close to the luminance of the first tone curve toward the high-gradation side is able to be generated. That is, such a generating method is suitable for a method of generating the second tone curve that lowers the luminance on the low-gradation side.

The shape of the gamma curve is able to be changed by adjusting an argument or the $\gamma$ value, similarly to the cosine curve. Specifically, the gamma curve is obtained by linearly mapping a lower limit value and an upper limit value of the argument with respect to a lower limit (gradation value corresponding to 0 gradation or 0% luminance) and an upper limit (gradation value corresponding to 4095 gradation or maximum luminance) of the gradation value and raising the $\gamma$ value to a line that is obtained. Thus, the second tone curve in which the luminance on the low-luminance side is lowered compared to the first tone curve by multiplying the first tone curve by the gamma curve in which the argument or the $\gamma$ value to be raised is appropriately adjusted is able to be created.

In the example of FIG. 3, as the second tone curve, one obtained by multiplying the first tone curve by the gamma curve in which the argument is 0.1 or more and 1 or less and the $\gamma$ value is 1.5 is illustrated.

Note that, by considering the display performance limit (black display performance) of the liquid crystal display device 1 or a structure of the HDR image, the lower limit value and the upper limit value of the argument may be remapped to the lower limit of the gradation value so that the display luminance of the liquid crystal display device 1 is 0 (0% luminance) at the lower limit. In this case, the second tone curve by which occurrence of black out is avoided is able to be created.

(Modification Example of the First and Second Tone Curves)

Figure 4:
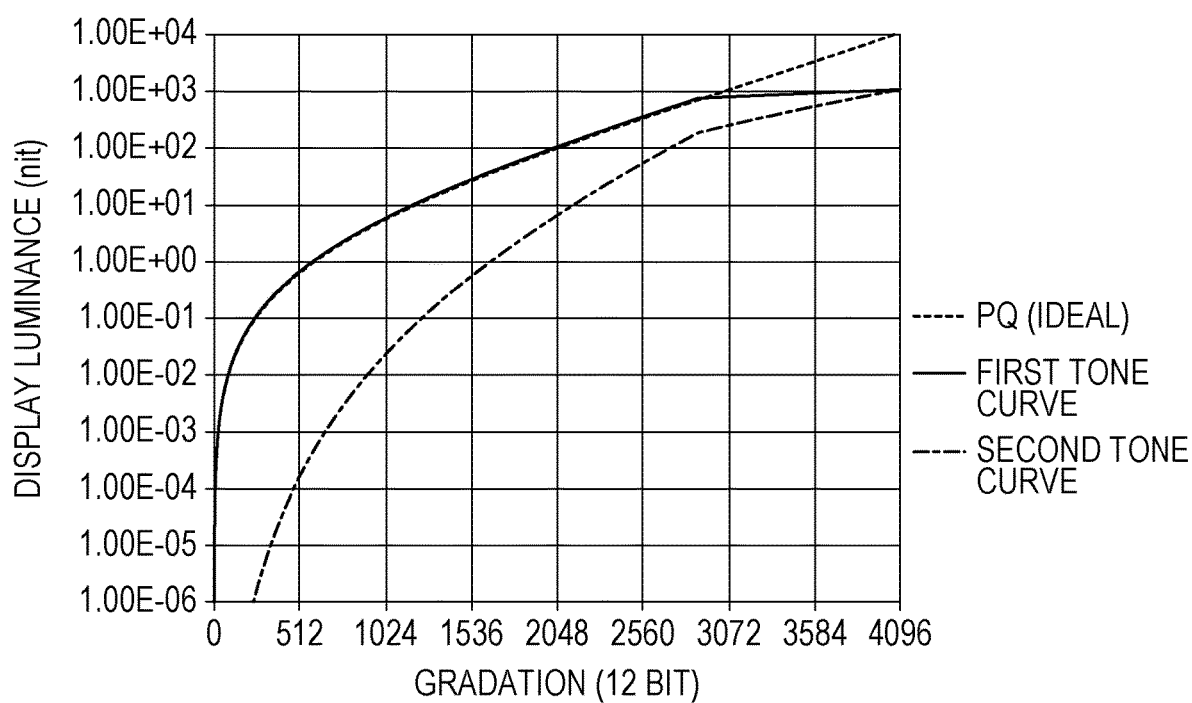
FIG. 4 is a diagram illustrating another example of tone curves used in the display control circuit.

Next, a modification example of the first and second tone curves will be described with reference to FIG. 4. FIG. 4 is a diagram illustrating another example of tone curves used in the display control circuit 50.

The first tone curve is only required to be able to lower to the luminance of the dominant color having luminance higher than the upper limit luminance to the upper limit luminance or less, and is not always required to be created by multiplying the tone curve of the HDR standard by an existing function. The first tone curve may have, for example, a shape illustrated in FIG. 4. The first tone curve has the following shape of (1) and (2):

(1) the shape which is the same as that of the tone curve of the HDR standard in a range equal to or less than a gradation value (about 2900 gradation in FIG. 4, and hereinafter, referred to as a threshold) corresponding to luminance slightly lower than the upper limit (maximum luminance) of the luminance realizable in the liquid crystal display device 1, and (2) in which the luminance increases so that luminance corresponding to maximum gradation (4095 gradation in FIG. 4) is the maximum luminance of the liquid crystal display device 1 in a range larger than the threshold, in order to avoid white out during display of the HDR image.

In the example of FIG. 4, in the range larger than the threshold, the luminance linearly and gradually increases up to the maximum luminance of the liquid crystal display device 1. The threshold is a gradation value corresponding to the upper limit luminance described above, and may be a gradation value corresponding to luminance that is 0.99 times as much as the maximum luminance of the liquid crystal display device 1, for example.

For example, the upper limit luminance may be decided on the basis of a formula of 0.96×log(maximum luminance of liquid crystal display device 1)<log(upper limit luminance) <0.995×log (maximum luminance of liquid crystal display device 1).

The upper limit luminance may be set by considering display performance of the liquid crystal display device 1, such as balance of RGB, when the liquid crystal display device 1 displays the display target image. The upper limit luminance may be the maximum luminance of the liquid crystal display device 1.

Additionally, the upper limit luminance (threshold) may be changed in accordance with a type of the HDR image to be displayed.

Note that, as described above, in the example of FIG. 4, the first tone curve is bent at the threshold, but may be adjusted so as to be smoothly curved from the part or may be adjusted so as to be a curved line in which inclinations (that is, a differential value) of the first tone curve before and after the threshold (switching point) are matched. That is, also in the example of FIG. 4, the first tone curve may be a smooth curved line that is not bent as a whole.

The second tone curve illustrated in FIG. 4 is obtained by multiplying the first tone curve by the gamma curve ($\gamma$ value=5).

Note that, the shape of the second tone curve may be appropriately deformed so as not to generate the black out also in the example of FIG. 4. For example, it is possible to deform the second tone curve illustrated in FIG. 4 so that display luminance of the second tone curve satisfies $(1-f) \times t1 + f \times t2$, where a distribution factor f that linearly changes from 0 to 1 in accordance with the gradation is set, the display luminance of the first tone curve illustrated in FIG. 4 is t1, and the display luminance of the second tone curve illustrated in FIG. 4 is t2.

(Another Modification Example of First and Second Tone Carves)

(1) The first tone curve may be a combination of a plurality of tone curves. For example, the first tone curve may be created by setting a predetermined gradation value (example: 512, 1024, or 2048 gradation) as an adjustment point and multiplying the tone curve of the HDR standard by a factor, such as the γ value, which allows a continuous curved line at the adjustment point. The adjustment point may be provided for each 500 gradation.

Thereby, color balance based on display request required by the HDR image is able to be adjusted.

(2) In the above, any of the R, G, and B that are the three primary colors of the picture element is decided as the dominant color or the non-dominant color, but the dominant color or the non-dominant color is not required to be limited to any of the R, G, or B. Each of the dominant color and the non-dominant color may be expressed by, for example, a 24 division color (hue component). In this case, each of the dominant color and the non-dominant color is expressed on the basis of a 24 hue circle of PCCS (Practical Color Co-ordinate System). In other words, the dominant color specification unit 51 may specify the dominant color and the non-dominant color on the basis of a hue circle that is divided into a plurality of hues in advance.

The 24 hue circle of the PCCS is generally used in a field of color design or psychology. The 24 hue circle is one in which colors having maximum chroma of 24 hues are arrayed to be perceptually shifted with an equal rate and which is created not on the basis of the three primary colors of the R, G, and B but on the basis of psychophysical four primary colors (R, G, B, and Y (Yellow)) which are easy for a human to perceive psychologically (sensuously). Specifically, the 24 hue circle is one in which the psychophysical four primary colors are equally arranged and 24 colors are then arranged so that colors adjacent to each other are in a similar color relation and colors arranged to be opposed to each other are not physically but psychologically in a complementary relation.

The dominant color and the non-dominant color may be expressed as described above by considering that it is not easy to display, in the liquid crystal display device 1, the original image as per the color corresponding to the gradation value indicated by the input image data. The dominant color specification unit 51 specifies a psychophysical color obtained by converting a physical color, which is indicated by the original image, as the dominant color or the non-dominant color by using the 24 hue circle.

In this case, each of colors of the 24 hue circle in a certain lightness is associated with a combination of the gradation values of the R, G, and B in advance. In order to simplify succeeding processing, input image data of the R, G, and B is linearized. The dominant color specification unit 51 specifies to which color in the 24 hue circle a combination of a red gradation value, a green gradation, and a blue gradation value of a picture element included in the input image data corresponds and specifies the specified color as the dominant color. The dominant color specification unit 51 specifies, as the non-dominant color, a color representing a complementary color of the color specified as the dominant color in the 24 hue circle. In a case where the dominant color is 12:G, the non-dominant color is 24:RP.

The luminance decision unit 52 applies the first tone curve to the dominant color that is specified by using the 24 hue circle and applies the second tone curve to the non-dominant color that is specified by using the 24 hue circle. Specifically, first, from data of a picture element that is expressed by RGB, the luminance decision unit 52 generates a hue, chroma, and lightness of the picture element. For example, a case where (1) there are three colors of 12:G, 24:RP, and gray, and the R, G, and B are given so that the lightness in all the three colors is equal, and (2) in a straight line connecting the 12:G and the 24:RP in the 24 hue circle, a color of the picture element is configured such that the 12:G is 80% and the 24:RP is 20% is considered. In this case, the first tone curve is applied to 80% of lightness (linearly expressed also in the case) and the second tone curve is applied to 20%. After application of these tone curves, color components of the picture element are returned to the R, G, and B having lightness corresponding to the 12:G and the 24:RP and are combined and thus display luminance of the picture element is able to be decided.

Note that, it is originally preferable that calculation is performed by using R, G, and B values and chroma of gray, but in the present embodiment, the chroma is enlarged so as to change from −1 to 1, and the chroma is thereby changed between the dominant color and the non-dominant color representing a complementary color of the dominant color. This may cause a deviation from the straight line in a region where the chroma is low due to discrepancy between the psychological color and the physical color, but in the present embodiment, determination of the dominant color is not applied to a region where the chroma is sufficiently low. In other words, such a problem is not notable because all are regarded as dominant colors.

In this manner, by deciding the first and the second tone curves to be applied by using the 24 hue circle, it is possible to express the HDR image with a more natural color and suppress occurrence of a change of a color from the original image due to use of a tone curve of a standard other than the HDR standard.

Note that, description has been given above on the basis of the 24 hue circle of the PCCS, but the number of colors to be divided is not particularly limited and the colors may have types of 6, 12, or 20 types, for example. Note that, according to the JIS standard, a 20 hue circle is proposed.

(3) The liquid crystal display device 1 may include a plurality of kinds of second tone curves in advance, and the luminance decision unit 52 may select a second tone curve, which is to be applied, in accordance with a type of the HDR image.

As the plurality of kinds of second tone curves, a plurality of second tone curves which have different luminance lowering rates may be included, for example. The luminance decision unit 52 may select the second tone curve, which is to be applied, on the basis of chroma information of the input image data. For example, the luminance decision unit 52 selects a second tone curve having a higher luminance lowering rate on the low-gradation side for a picture element having higher color purity. Thereby, the color purity of the picture element is able to be kept. Moreover, since the second tone curve is applied only to the non-dominant color, it is possible to prevent display of an unnatural image.

The luminance decision unit 52 may create a new second tone curve, which is to be actually applied, by selecting two second tone curves in accordance with the type of the HDR image among the plurality of second tone curves and executing interpolation processing for the two second tone curves.

The luminance decision unit 52 may select a second tone curve in accordance with a preference of a user (that is, on the basis of a user instruction) about the color tone.

Instead of preparing the plurality of second tone curves, an LUT that has a similar function to those of the plurality of second tone curves may be prepared. Particularly, in a case where a three-dimensional LUT is used, it is possible to accurately perform adjustment of the display luminance and perform the adjustment of the display luminance in various patterns. Also in a case where a plurality of first tone curves are prepared, an LUT may be prepared. Moreover, also in a case where one type of the first tone curve and one type of the second tone curves are used, an LUT that has a similar function to those of the first and second tone curves may be provided.

(4) The shape of the first tone curve may be any shape as long as the aforementioned conditions are satisfied. For example, a shape on the high-luminance side may be a straight line, or a shape according to an exponential function, an inverse exponential function, a logarithmic function, or a trigonometric function as long as an unnatural image is not displayed. The shape of the first tone curve may be decided by reflecting a result obtained by measuring the display performance of the liquid crystal display device 1 in detail.

Furthermore, in a case where the second tone curve is created, a sine curve may be used as a target to be multiplied to the first tone curve instead of the gamma curve. That is, the second tone curve may also have various shapes in accordance with the shape of the first tone curve.

(5) Even in a case where the display gradation of the liquid crystal display device 1 is 8 bits, by assuming that the display gradation of the input image data is 12 bits, it is preferable that liquid crystal display device 1 includes 10-bit or 12-bit tone curves as the first and second tone curves.

In this case, the display gradation of the liquid crystal display device 1 is simulatively increased (pseudo multi gradation technique) by superposing different noise patterns (dither patterns) for each of the pixels 11 onto the respective pixels 11 or averaging the display gradation over a plurality of frames constituting the input image data or frames obtained by dividing one frame. Thereby, an image is able to be displayed while keeping the display gradation of the input image data.

Note that, from a viewpoint of a resource to execute image processing of the liquid crystal display device 1, the display gradation of the input image data may be kept by preparing an 8-bit tone curve and executing interpolation processing by the display control circuit 50 for the other remaining lower bits in the input image data. The interpolation processing may be linear interpolation or interpolation using a curve pattern that is set in advance.

(6) As a method of recording the input image data, scene-linear/ACES may be used. The adjustment of the display luminance is able to be performed by a simple formula (linear expression) by using the scene-linear/ACES.

(7) The display performance limit of the liquid crystal display device 1 may vary depending on a color. This is because there is a possibility that the display performance limit is changed depending on a configuration or performance of the backlight, or a configuration or performance of a color filter. The first tone curve may be created or a shape thereof may be adjusted in accordance with a display performance limit of each of colors by considering the situation. Moreover, the first tone curve created by considering the situation may be prepared in advance. In this case, the luminance decision unit 52 decides the first tone curve, which is to be applied, in accordance with a color of the dominant color.

In general, in a monitor whose usage includes display of a natural image, in a case where keeping color balance is considered, display is not able to be performed so that only one color is outstanding by exceeding a display performance limit of another color, and there are few cases where an image is adjusted so that such display is able to be performed. In the present embodiment, since the gradation of the non-dominant color is lower than the gradation of the dominant color, there is a low possibility that display is performed so that only one color is outstanding by exceeding the display performance limit as described above. Thus, it becomes possible to perform appropriate display in accordance with the display performance limit. Note that, there is also a possibility that a monitor in which a display performance limit of one color is outstanding is manufactured as a monitor for special usage, and a normal HDR image is displayed in the monitor. In this case, a temporary display performance limit of each of colors is set by considering the color balance conforming to the HDR standard, the display performance limit of one outstanding color is set to the temporary display performance limit, and after that, processing according to an aspect of the disclosure is able to be applied.

(Adjustment of Tone Curves)

The liquid crystal display device 1 may be provided with an adjustment mechanism for changing the shapes of the first and second tone curve. For example, the adjustment mechanism is an operation key by which the shapes of the first and second tone curves are changed in accordance of a preference of a user.

A parameter (example: the value of θ of the cosine curve, the value of the argument of the gamma curve, or a value to be raised) by which the shapes of the first and second tone curves are decided may be decided by considering various conditions such as ideal luminance and the display capability of the liquid crystal display device 1. However, it is necessary to set the parameter so that monotony of the luminance-gradation characteristics is not lost or an unnatural shape (shape that is not smooth) is not provided at the threshold.

For example, in the example of FIG. 3, it is premised that luminance=0 is satisfied in a case of black, but for example, in a display device of a shutter type that uses liquid crystal, there is a possibility that luminance=0 is difficult to be expressed. In this case, an offset may be provided in the first and second tone curves.

In a case where a display gradation number of the liquid crystal display device 1 is insufficient as the display capability (device characteristics) of the liquid crystal display device 1 in an appropriate luminance region, the shapes of the first and second tone curves may be shapes by which the display gradation number is able to be satisfied.

Additionally, in a case where a color shift occurs due to the display luminance in the liquid crystal display device 1, the shapes of the first and second tone curves may be adjusted for each of the colors.

(Effect of Applying First and Second Tone Curves)

As described above, by applying the first tone curve to an HDR image having a picture element that has luminance exceeding the predetermined luminance (upper limit luminance), and the liquid crystal display device 1 is able to display the HDR image within the range of the display capability of the liquid crystal display device 1.

Note that, in a case where only the first tone curve is applied to the HDR image, there is a possibility that the following problem is caused.

For example, a case where the maximum luminance of the liquid crystal display device 1 is 1000 nit and gradation values (R, G, B) of a certain picture element of the HDR image=(2700, 3840, 0) are provided is considered. For example, with reference to FIG. 4, in the tone curve of the HDR standard, luminance corresponding to the green gradation value that is high gradation is about 6000 nit and luminance corresponding to the red gradation value that is low gradation is about 500 nit. In the liquid crystal display device 1, in a case where the first tone curve illustrated in FIG. 4 is applied, actual display is performed in such a manner that the luminance corresponding to the green gradation value becomes about 1000 nit and the luminance corresponding to the red gradation value becomes about 500 nit.

In the aforementioned example, even though a contrast ratio between the red and the blue according to the HDR standard is about 12, a phenomena that the contrast ratio actually decreases to about 2 occurs. In this case, the picture element exhibits almost pure green according to the HDR standard, but exhibits yellow green in the actual display in which the first tone curve is applied. That is, an original color tone of the HDR image changes in the actual display.

Note that, depending on gradation, it is also possible to keep a contrast ratio of the HDR image by local dimming. However, in the HDR image having the picture element that has luminance exceeding the upper limit luminance as described above, it is difficult to keep the contrast ratio by the local dimming. In a case where the contrast ratio described above occurs in a range narrower than a range in which backlight control is enabled, the contrast ratio is not able to be kept.

The liquid crystal display device 1 applies, to the HDR image, the second tone curve as a color correction tone curve with the first tone curve. Thus, it is possible to suppress the change of the color tone.

In the aforementioned example, the second tone curve is applied to the red gradation value corresponding to the non-dominant color. In this case, in the example of FIG. 4, the luminance corresponding to the red gradation value is about 100 and the contrast ratio is about 10. This makes it possible to improve color reproduction compared to a case where the second tone curve is not applied.

(Flow of Processing in Liquid Crystal Display Device 1)

An example of a flow of processing in the liquid crystal display device 1 will be described with reference to FIG. 5. FIG. 5 is a flowchart illustrating the example of the flow of the processing in the liquid crystal display device 1. The flowchart indicates an example of processing in which in a case where input image data includes a picture element that has luminance exceeding the upper limit luminance, the first and second tone curves are applied, and in a case where the input image data does not include the picture element, the tone curve of the HDR standard is applied as it is.

When receiving the input image data indicating an HDR image (S1), the dominant color specification unit 51 specifies the dominant color and the non-dominant color in each of picture elements of the HDR image by analyzing the received input image data (S2). The dominant color specification unit 51 transmits, to the luminance decision unit 52, dominant color specification data that indicates the dominant color and the non-dominant color in each of the picture elements.

The luminance decision unit 52 determines whether or not the input image data includes a gradation value having a gradation value which corresponds to the dominant color specified by the dominant color specification unit 51 and which is larger than a gradation value corresponding to the upper limit luminance (S3). When determining chat the input image data includes the gradation value larger than the gradation value corresponding to the upper limit luminance (Yes at S3), the luminance decision unit 52 decides application of the first tone curve to the dominant color and application of the second tone curve to the non-dominant color. Then, the luminance decision unit 52 decides output values (display luminance) of sub pixels that correspond to each of the picture elements of the HDR image (original image) indicated by the input image data by using the first and second tone curves that are decided (54).

On the other hand, when the input image data does not include the gradation value larger than the gradation value corresponding to the upper limit luminance (No at S3), the luminance decision unit 52 decides output values (display luminance) of the sub pixels by applying the tone curve of the HDR standard to the dominant color and the non-dominant color as it is (S5).

The luminance decision unit 52 transmits, to the luminance control unit 53, a display target image in which the display luminance of the sub pixels, which is decided in processing at S4 or S5, is reflected, that is, output image data indicating the display target image to which the first and second tone curves are applied.

In order to control a light transmittance of each of the sub pixels, the luminance control unit 53 transmits, to the source driver 30, the output image data received from the luminance decision unit 52 and a timing signal indicating a timing when the output image data is displayed on the liquid crystal panel 10. At the timing based on the timing signal, the source driver 30 applies, to a pixel electrode of each of the pixels 11, a voltage corresponding to the gradation values (that is, the display luminance of the sub pixels) of each of the picture elements indicated by the output image data. The display control circuit 50 controls the gate driver 20 and the backlight 40 together with control of the source driver 30. Thereby, at an appropriate timing, the voltage is applied to the pixel electrode and the backlight 40 is lighted up, and thus the KDR image is displayed on the liquid crystal panel 10 (S6).

Effect of Liquid Crystal Display Device 1 According to Present Embodiment

The display control circuit 50 of the present embodiment lowers the luminance of the dominant color having luminance higher than the upper limit luminance to the predetermine luminance or less and lowers the luminance of the non-dominant color. Specifically, the luminance decision unit 52 applies the first and second tone curves to a picture element having the dominant color. Thereby, the liquid crystal display device 1 is able to display the HDR image within a range of the second dynamic range of the liquid crystal display device 1 and suppress a change of a color tone of the HDR image. Accordingly, the liquid crystal display device 1 is able to faithfully display the HDR image as much as possible.

Moreover, the luminance decision unit 52 may apply the first tone curve in a case where the luminance of the dominant color is higher than the upper limit luminance and may apply the tone curve of the HDR standard in a case where the luminance is the upper limit luminance or less (that is, mapping may be performed in accordance with the standard). In this case, the display performance of the liquid crystal display device 1 is able to be maximally utilized.

Note that, also in a case where the luminance of the dominant color is the upper limit luminance or less, the first tone curve may be applied.

Embodiment 2

The luminance decision unit 52 may decide the first and second tone curves, which are to be applied, on the basis of metadata attached to the input image data.

For example, in the metadata, data indicating a luminance range required to display the HDR image is included. On the other hand, the liquid crystal display device 1 includes a plurality of kinds of first tone curves.

Examples of the first tone curve used in the present embodiment include the following (1) and (2).
(1) A first tone curve (example: refer to FIG. 3) which is created so that, in the maximum gradation value (4095 gradation in a case of 12-bit data) of the HDR image, display luminance of the dominant color is the maximum luminance of the liquid crystal display device 1.
(2) A plurality of first tone curves which are created so that display luminance corresponding to gradation values of 95%, 90%, 85%, and . . . of the maximum gradation value of the HDR image is the maximum luminance of the liquid crystal display device 1.

The first tone curves are not required to be prepared for every 5% as described above, and may be more finely prepared (example: for every 1% or every one gradation). Mote that, a plurality of second tone curves are prepared on the basis of the respective first tone curves.

The luminance decision unit 52 analyzes the metadata attached to the input image data and thereby selects a first tone curve by which, in a gradation value corresponding to maximum luminance indicated by the metadata, the maximum luminance (or upper limit luminance) realizable by the liquid crystal display device 1 is achievable. In other words, the luminance decision unit 52 selects, among the plurality of first tone curves that are prepared, a first tone curve by which display luminance in a maximum luminance gradation value indicated by the input image data becomes the maximum luminance of the liquid crystal display device 1 or becomes close to the maximum luminance as much as possible.

The luminance decision unit 52 applies the selected first tone curve to the dominant color, selects a second tone curve corresponding to the selected first tone curve, and applies the selected second tone curve to the non-dominant color.

Moreover, the luminance decision unit 52 may use a tone curve for an SDR image in a case where the maximum luminance of the HDR image to be displayed is within the range of the display capability of the liquid crystal display device 1.

Modification Example of Metadata

The metadata includes object information indicating what kind of object the HDR image indicates, and the luminance decision unit 52 may select the first tone curve, which is to be applied, on the basis of the information. The object information, is, for example, information indicating that the shining sun or a sparkling gem is displayed.

Effect of Liquid Crystal Display Device 1
According to Present Embodiment

By preparing the plurality of first tone curves, the liquid crystal display device 1 is able to change the first tone curve, which is to be applied, in accordance with a maximum value of luminance of the dominant color indicated by the HDR image. Furthermore, in a case where the first tone curve applicable when the maximum luminance of the HDR image is lower than the maximum luminance of the liquid crystal display device 1 is prepared, the liquid crystal display device 1 is able to achieve display with high gradation accuracy by appropriately controlling the backlight as well.

Additionally, the liquid crystal display device 1 is able to easily specify various parameters such as the luminance range of the HDR image by analyzing the metadata.

Embodiment 3

The luminance decision unit 52 may decide the first and second tone curves, which are to be applied, on the basis of a result obtained by analyzing luminance information (each of gradation values in each of picture elements) of the HDR image.

For example, in a case where the HDR image that is the original image is a moving image (video), the luminance decision unit 52 may decide the first and second tone curves by utilizing gradation values, which are obtained when gradation values (luminance values) of a plurality of frames constituting the input image data indicating the HDR image are subjected to statistical processing (smoothing processing using a low pass filter, weighted moving average, or the like).

In the liquid crystal display device 1, a plurality of first tone curves are prepared so that the luminance decision unit 52 is able to select an optimum first tone curve for each of the frames. An example of the plurality of first tone curves is as described in Embodiment 2. The luminance decision unit 52 selects, among the prepared first tone curves, a first tone curve by which display luminance in a maximum gradation value of the dominant color of each of the frames is the maximum luminance of the liquid crystal display device 1 or is close to the maximum luminance as much as possible.

However, in a case where the selection is performed in this manner, when a luminance difference of the dominant color before and after the frame is large, there is a possibility that a flicker occurs during display of the HDR image. In order to suppress the flicker, the first tone curve is preferably selected after the plurality of frames are subjected to the statistical processing.

By using a maximum gradation value (corresponding to maximum luminance) of the dominant color that is specified for each of the plurality of frames to execute the statistical processing, the luminance decision unit 52 decides the first tone curve applied to each of the frames. The luminance decision unit 52 may decide the first tone curve, which is to be applied so that a difference of maximum display luminance of the dominant color between frames (for example, between adjacent frames) is a difference not to cause the flicker.

For example, in a case where the liquid crystal display device 1 allows read-ahead of a frame, the dominant color specification unit 51 reads, for example, 15 frames ahead of a frame that is a display target and specifies maximum gradation values of dominant colors in the respective frames. The luminance decision unit 52 performs statistical processing of a plurality of maximum gradation values so that a difference of the specified plurality of maximum gradation values between frames becomes small and thereby calculates a corrected maximum gradation value for each of the frames. The statistical processing is, for example, processing in which a formula indicating an approximate curved line approximating a change of the maximum gradation values between the frames is calculated and the corrected maximum gradation value for each of the frames is calculated from the approximate curved line.

The luminance decision unit 52 decides a first tone curve corresponding the corrected maximum gradation value for each of the frames, and applies the first tone curve to the dominant color. For each of the frames, the luminance decision unit 52 selects, as the first tone curve to be actually applied, a first tone curve by which display luminance of the corrected maximum gradation value of the dominant color is the maximum luminance of the liquid crystal display device 1 or is close to the maximum luminance as much as possible. For each of the frames, the luminance decision unit 52 decides a second tone curve based on the first tone curve to be applied.

Note that, in a case where the first tone curve is selected after performing the read-ahead, it is preferable that the display control circuit 50 delays an output timing of each of the frames compared to a case where the processing is not performed, in order to ensure a time of the processing.

The processing is not required to be performed for all the frames, and may be performed at a predetermined frame interval. That is, an optimum first tone curve is not required to be selected for all the frames. This is because even when variation in luminance between adjacent frames is large, a problem is not caused in some cases from a viewpoint of an actual display speed. A time required for changing the first and second tone curve to be applied and luminance of the backlight is preferably, for example, about 0.5 seconds or more and 5 seconds or less and more preferably about 1 second or more and 2 seconds or less from a viewpoint of suppressing the flicker.

The luminance decision unit 52 may perform the statistical processing by using a plurality of frames (referred to as past frames) that have been already displayed instead of the read-ahead of the frames. For example, the luminance decision unit 52 executes the statistical processing (for example, weighted moving average) by using a frame (referred to as a current frame) that is a display target and the plurality of past frames (for example, 15 frames immediately before the current frame). The luminance decision unit 52 obtains a corrected maximum gradation value of the current frame by the statistical processing and decides a first tone curve on the basis of the corrected maximum gradation value, similarly to the above. In a case where the weighted moving average is executed, weighting to a maximum gradation value (corresponding to a maximum luminance value) of a dominant color of the current frame is preferably about 2% or more and 10% or less and more preferably about 3% or more and 6% or less. That is, by making weighting of the past frames larger than weighting of the current frame, a possibility that the first tone curve capable of suppressing the flicker is able to be selected increases. Moreover, by storing a maximum gradation value of the dominant color of each of the past frames in the memory 54, it becomes possible to perform the statistical processing.

The luminance decision unit 52 may perform the statistical processing by using a minimum gradation value or an average gradation value of each of the frames instead of the maximum gradation value of the frame to decide a first tone curve to be applied to the frame.

For luminance of the dominant color of each of the frames, the luminance decision unit 52 may refer to the metadata attached to the frame.

Effect of Liquid Crystal Display Device 1 According to Present Embodiment

The liquid crystal display device 1 is able to display the HDR image while suppressing the flicker by selecting the first tone curve in accordance with the maximum luminance of each of the frames.

[Example of Realization by Software]

A control block (in particular, the dominant color specification unit 51, the luminance decision unit 52, and the luminance control unit 53 of the display control circuit 50) of the liquid crystal display device 1 may be realized by a logic circuit (hardware) formed in an integrated circuit (IC chip) or the like or may be realized by software with use of a CPU (Central Processing Unit).

In the latter case, the liquid crystal display device 1 includes a CPU that executes a command of a program that is software realizing each of functions, a ROM (Read Only Memory) or a storage device (each referred to as a "recording medium") in which the program and various kinds of data are stored so as to be readable by a computer (or a CPU), a RAM (Random Access Memory) that develops the program, and the like. An object of an aspect of the disclosure is achieved by a computer (or a CPU) reading and executing the program from the recording medium. As the recording medium, for example, a "non-transitory tangible medium" such as a tape, a disk, a card, a semiconductor memory, or a programmable logic circuit may be used. The program may be supplied to the computer via any transmission medium (such as a communication network or a broadcast wave) which enables the program to be transmitted. Note that, the aspect of the disclosure can also be achieved in a form of a data signal in which the program is embodied through electronic transmission and which is embedded in a carrier wave.

[Conclusion]

A display device (liquid crystal display device 1) according to an aspect 1 of the disclosure is a display device that displays an original image, which includes a plurality of picture elements and has a first dynamic range, in a second dynamic range narrower than the first dynamic range. Each of the plurality of picture elements is displayed by a plurality of colors or a combination of the plurality of colors, and image data (input image data), which indicates the original data, has a plurality of gradation values corresponding to the plurality of colors in each of the plurality of picture elements. The display device includes a display control unit (display control circuit 50) that sets, among the plurality of colors, a color corresponding to a maximum gradation value of gradation values of the picture element to a dominant color and sets a color other than the dominant color to a non-dominant color, and that lowers luminance of a dominant color having luminance higher than predetermined luminance (upper limit luminance) to be the predetermined luminance or less and lowers luminance of the non-dominant color.

According to the aforementioned configuration, the display device is able to display the original image, which has a dynamic range wider than that of the display device, within a range of the dynamic range of the display device. Moreover, the display device is able to suppress a change of a color tone of the original image when displaying the original image.

Furthermore, in the display device according to an aspect 2 of the disclosure, in the aspect 1, the display control unit may lower the luminance of the non-dominant color by a second pattern (second tone curve) that is decided on the basis of a first pattern (first tone curve) that lowers the luminance of the dominant color.

According to the aforementioned configuration, it is possible to lower the luminance of the non-dominant color by considering the lowering of the luminance of the dominant color. Thus, it is possible to appropriately suppress the change of the color tone of the original image when displaying the original image.

Furthermore, in the display device according to an aspect 3 of the disclosure, in the aspect 1 or 2, a display mode of the original image is switchable among a plurality of display modes, and the display control unit may lower the luminance of the dominant color by a pattern that is decided in accordance with the display mode.

According to the aforementioned configuration, the display device is able to lower the luminance of the dominant color in accordance with the display mode.

Furthermore, in the display device according to an aspect 4 of the disclosure, in any of the aspects 1 to 3, the display control unit may lower the luminance of the dominant color by a pattern that is decided on the basis of metadata attached to the original image.

According to the aforementioned configuration, the display device is able to lower the luminance of the dominant color on the basis of a result obtained by analyzing the metadata.

Furthermore, in the display device according to an aspect 5 of the disclosure, in any of the aspects 1 to 3, the display control unit may lower the luminance of the dominant color by a pattern that is decided on the basis of a result obtained by analyzing luminance information of the original image.

According to the aforementioned configuration, it is possible to lower the luminance of the dominant color on the basis of the result obtained by analyzing the luminance information of the original image.

Furthermore, in the display device according to an aspect 6 of the disclosure, in the aspect 5, the pattern may be decided by using a value obtained by performing statistical processing of gradation values of a plurality of frames constituting a video as the original image.

According to the aforementioned configuration, it is possible to lower the luminance of the dominant color on the basis of a result of the statistical processing of the plurality of frames. Thus, occurrence of a flicker, which can be caused when displaying the original data due to a large difference between maximum display luminance of frames, is able to be suppressed.

Furthermore, in the display device according to an aspect 7 of the disclosure, in any of the aspects 1 to 6, in a case where a difference between two high-order gradation values among the gradation values of the picture element is within a predetermined range, the display control unit may specify, as dominant colors, two colors corresponding to the two high-order gradation values.

According to the aforementioned configuration, in a case where the two colors among the plurality of colors of the picture element are specified as the dominant colors and luminance of each of the two colors exceeds the predetermined luminance, it is possible to lower the luminance to the predetermined luminance or less.

Furthermore, in the display device according to an aspect 8 of the disclosure, in any of the aspects 1 to 6, in a case where a second largest gradation value among the gradation values of the picture element is larger than a specific gradation value, the display control unit may specify, as dominant colors, two colors corresponding to two high-order gradation values.

According to the aforementioned configuration, a similar effect to that of the aspect 7 is exerted.

Furthermore, in the display device according to an aspect 9 of the disclosure, in the aspect 2, the display control unit may set, in the non-dominant color, a color corresponding to a gradation value other than a minimum gradation value among the gradation values of the picture element as an intermediate color, and may lower luminance of the intermediate color by a third pattern (third tone curve) that is decided on the basis of the first pattern and the second pattern.

According to the aforementioned configuration, it is possible to lower the luminance of the intermediate color by considering the lowering of the luminance of the dominant color and the luminance of non-dominant color.

Furthermore, in the display device according to an aspect 10 of the disclosure, in any of the aspects 1 to 9, the display control unit may specify the dominant color and the non-dominant color on the basis of a hue circle that is divided into a plurality of hues in advance.

According to the aforementioned configuration, the first tone curve is applied to the dominant color that is decided on the basis of the hue circle and the second tone curve is applied to the non-dominant color that is decided on the basis of the hue circle. Thus, it is possible to display the original image with a more natural color and suppress occurrence of a change of a color from that of the original image due to use of the first and second tone curves.

Furthermore, in the display device according to an aspect 11 of the disclosure, in any of the aspects 1 to 10, in a case where the original image is a YUV image, the display control unit may specify the dominant color for a picture element group including the plurality of picture elements that use a common color difference signal.

According to the aforementioned configuration, it is possible to simplify specific processing of the dominant color and the non-dominant color.

Furthermore, a method for controlling a display device according to an aspect 12 of the disclosure is a method for controlling a display device that displays an original image, which includes a plurality of picture elements and has a first dynamic range, in a second dynamic range narrower than the first dynamic range, in which each of the plurality of picture elements is displayed by a plurality of colors or a combination of the plurality of colors, and image data, which indicates the original data, has a plurality of gradation values corresponding to the plurality of colors in each of the plurality of picture elements. The method includes a display controlling step of setting, among the plurality of colors, a color corresponding to a maximum gradation value of gradation values of the picture element to a dominant color and setting a color other than the dominant color to a non-dominant color, and lowering luminance of a dominant color having luminance higher than predetermined luminance to be the predetermined luminance or less and lowering luminance of the non-dominant color.

According to the aforementioned method, a similar effect to that of the aspect 1 is exerted.

The display device according to each of the aspects of the disclosure may be realized by a computer, and, in this case, a display control program for the display device, which causes the computer to operate as the respective units (software elements) provided in the display device to thereby realize the display device by the computer, and a computer readable recording medium which stores the display control program therein are also included in the scope of the disclosure.

[Additional Note]

The disclosure is not limited to each of the embodiments described above, and may be modified in various manners within the scope of the claims and an embodiment achieved by appropriately combining technical means disclosed in each of different embodiments is also encompassed in the technical scope of the disclosure. Further, by combining the technical means disclosed in each of the embodiments, a new technical feature may be formed.

CROSS REFERENCE TO RELATED APPLICATION

This application claims priority based on Japanese Patent Application No. 2016-222733 filed in Japan on Nov. 15, 2016, the content of which is incorporated herein by reference.

REFERENCE SIGNS LIST 1 liquid crystal display device (display device)
50 display control circuit (display control unit)

The invention claimed is:

1. A display device that displays an original image, which includes a plurality of picture elements and has a first dynamic range, in a second dynamic range narrower than the first dynamic range,
each of the plurality of picture elements being displayed by a plurality of colors or a combination of the plurality of colors, and
image data, which indicates the original data, having a plurality of gradation values corresponding to the plurality of colors in each of the plurality of picture elements,
the display device comprising
a display control unit
that sets, among the plurality of colors, a color corresponding to a maximum gradation value of gradation values of the picture element to a dominant color and sets a color other than the dominant color to a non-dominant color, and
that lowers luminance of a dominant color having luminance higher than predetermined luminance to be the predetermined luminance or less and lowers luminance of the non-dominant color.

2. The display device according to claim 1, wherein the display control unit lowers the luminance of the non-dominant color by a second pattern that is decided on a basis of a first pattern that lowers the luminance of the dominant color.

3. The display device according to claim 2, wherein the display control unit
sets, in the non-dominant color, a color corresponding to a gradation value other than a minimum gradation value among the gradation values of the picture element as an intermediate color, and
lowers luminance of the intermediate color by a third pattern that is decided on a basis of the first pattern and the second pattern.

4. The display device according to claim 1, wherein the display control unit lowers the luminance of the dominant color by a pattern that is decided on a basis of a result obtained by analyzing luminance information of the original image.

5. The display device according to claim 4, wherein the pattern is decided by using a value obtained by performing statistical processing of gradation values of a plurality of frames constituting a video as the original image.

6. The display device according to claim 1, wherein
a display mode of the original image is switchable among a plurality of display modes, and
the display control unit lowers the luminance of the dominant color by a pattern that is decided in accordance with the display mode.

7. The display device according to claim 1, wherein the display control unit lowers the luminance of the dominant color by a pattern that is decided on a basis of metadata attached to the original image.

8. The display device according to claim 1, wherein in a case where a difference between two high-order gradation values among the gradation values of the picture element is within a predetermined range, the display control unit specifies, as dominant colors, two colors corresponding to the two high-order gradation values.

9. The display device according to claim 1, wherein in a case where a second largest gradation value among the gradation values of the picture element is larger than a specific gradation value, the display control unit specifies, as dominant colors, two colors corresponding to two high-order gradation values.

10. The display device according to claim 1, wherein the display control unit specifies the dominant color and the non-dominant color on a basis of a hue circle that is divided into a plurality of hues in advance.

11. The display device according to claim 1, wherein
in a case where the original image is a YUV image,
the display control unit specifies the dominant color for a picture element group including the plurality of picture elements that use a common color difference signal.

* * * * *